(12) United States Patent
Jefford et al.

(10) Patent No.: US 7,814,893 B2
(45) Date of Patent: Oct. 19, 2010

(54) EXHAUST GAS RECIRCULATION SYSTEM MODULE WITH INTEGRAL VACUUM

(75) Inventors: Robert D. Jefford, Chatham (CA); Natalie Gagner, Chatham (CA); Ted Daneliuk, Essex (CA); Geoff Miller, Tilbury (CA)

(73) Assignee: Continental Automotive Canada, Inc., Chatham, Ontario (CA)

( * ) Notice: Subject to any disclaimer, the term of this patent is extended or adjusted under 35 U.S.C. 154(b) by 417 days.

(21) Appl. No.: 11/984,022

(22) Filed: Nov. 13, 2007

(65) Prior Publication Data

US 2008/0149079 A1    Jun. 26, 2008

Related U.S. Application Data

(60) Provisional application No. 60/859,746, filed on Nov. 17, 2006.

(51) Int. Cl.
*F02M 25/07*    (2006.01)
*F16K 31/02*    (2006.01)

(52) U.S. Cl. .................... 123/568.26; 123/568.17; 123/568.27; 123/568.28; 123/568.29; 123/568.21; 123/568.11; 73/114.74; 251/129.15; 137/907

(58) Field of Classification Search ........... 123/568.11, 123/568.27, 568.21, 568.16, 568.25, 568.26, 123/568.28, 568.29, 568.18, 568.32, 114.74; 137/907; 251/129.15

See application file for complete search history.

(56) References Cited

U.S. PATENT DOCUMENTS

| | | | | |
|---|---|---|---|---|
| 5,988,149 A | * | 11/1999 | Gates | 123/568.21 |
| 6,308,694 B1 | * | 10/2001 | Kotwicki et al. | 123/568.16 |
| 6,378,507 B1 | | 4/2002 | Gagnon | |
| 6,502,564 B1 | * | 1/2003 | Gagnon et al. | 123/568.27 |

* cited by examiner

*Primary Examiner*—Stephen K Cronin
*Assistant Examiner*—Raza Najmuddin

(57) ABSTRACT

A system module is provided for recirculating exhaust gases from an internal combustion engine to an intake manifold of the internal combustion engine. The module includes a body (12) including a passageway (41) between an exhaust gas inlet (32) and an exhaust gas outlet (34). An orifice (36) constricts the flow of exhaust gases proximate the exhaust gas outlet. A differential pressure sensor (38) is constructed and arranged to sense differential pressure across the orifice. A manifold absolute pressure sensor (42) is constructed and arranged to sense vacuum pressure associated with the exhaust gas outlet. A first hose (40) is coupled with the body and provides the differential pressure sensor with vacuum pressure on a first side of the orifice. A second hose (44) is coupled with the body and provides the manifold pressure sensor with vacuum pressure. The first and second hoses are integral with the system module.

13 Claims, 2 Drawing Sheets

EXHAUST GAS RECIRCULATION SYSTEM MODULE WITH INTEGRAL VACUUM

This application claims the benefit of the earlier filing date of U.S. Provisional Application No. 60/859,746, filed on Nov. 17, 2006, which is hereby incorporated by reference into this specification.

FIELD OF THE INVENTION

This invention relates to vehicle Exhaust Gas Recirculation (EGR) valves and an EGR System Module (ESM) that includes an EGR valve and, more particularly, to an ESM that eliminates the need for external vacuum supply lines and vacuum connections.

BACKGROUND OF THE INVENTION

The ESM is a vacuum actuated EGR system that obtains engine vacuum from a dedicated vacuum harness linking the intake manifold vacuum port to a vacuum supply port on the ESM. Conventional vacuum driven applications obtain source vacuum from the intake manifold pick-of-port and link to a device through conventional vacuum harness technology. Two connections to the intake vacuum port are required with the conventional configuration, one dedicated line for manifold absolute pressure (MAP) and one for an EGR vacuum regulator (EVR).

The conventional ESM system has field issues including vacuum harness damage, connection integrity, part robustness, system cost and ease of assembly. These issue are influencing ESM customers to investigate/source competing electric/solenoid driven EGR systems that do not require vacuum to operate.

Thus, there is a need to provide a robust and cost-effective ESM.

SUMMARY OF THE INVENTION

An object of the invention is to fulfill the need referred to above. In accordance with the principles of the present invention, this objective is obtained by providing a system module for recirculating exhaust gases from an internal combustion engine to an intake manifold of the internal combustion engine. The module includes a body including a passageway between an exhaust gas inlet and an exhaust gas outlet. An orifice constricts the flow of exhaust gases proximate the exhaust gas outlet. A differential pressure sensor is constructed and arranged to sense differential pressure across the orifice. A manifold absolute pressure sensor is constructed and arranged to sense vacuum pressure associated with the exhaust gas outlet. A first hose is coupled with the body and provides the differential pressure sensor with vacuum pressure on a first side of the orifice. A second hose is coupled with the body and provides the manifold pressure sensor with vacuum pressure. The first and second hoses are integral with the system module.

In accordance with another aspect of the invention, a system module for recirculating exhaust gases from an internal combustion engine to an intake manifold of the internal combustion engine includes a body having a passageway between an exhaust gas inlet and an exhaust gas outlet. First means are provided for sensing differential pressure across an orifice associated with the body. Second means are provided for sensing manifold absolute pressure associated with the exhaust gas outlet. Means, directly coupled with the body, provide the first means with vacuum pressure on a first side of the orifice. Means, directly coupled with the body, provide the second means with vacuum pressure.

In accordance with yet another aspect of the invention, a method is provided for supplying a differential pressure sensor and a manifold absolute pressure sensor of an exhaust gas recirculation system module with vacuum pressure. The method provides a differential pressure sensor and a manifold absolute pressure sensor of an exhaust gas recirculation system module. The differential pressure sensor is supplied with vacuum pressure with a first hose. The manifold absolute pressure sensor is supplied with vacuum pressure with a dedicated second hose. The first and second hoses are integral with the system module.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
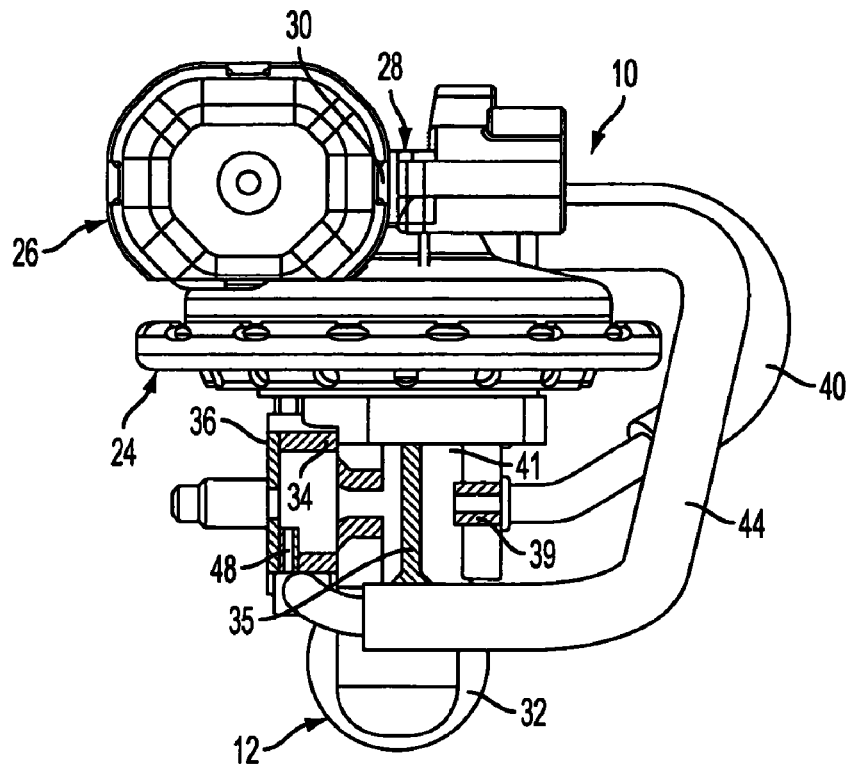
FIG. 1 is a front view, partially in section, of an ESM with integral pick-off tube provided in accordance with an embodiment of the invention.
Figure 2:
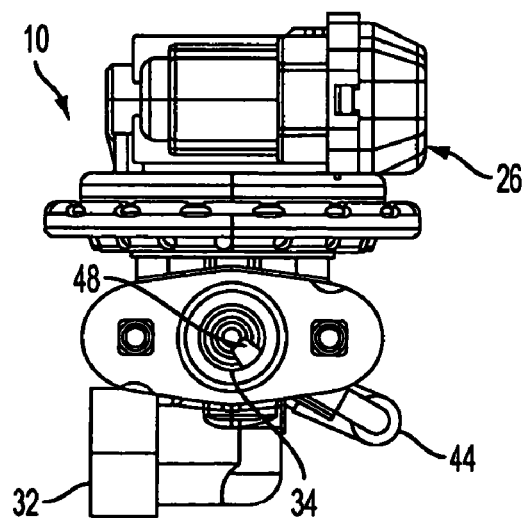
FIG. 2 is side view of the ESM of FIG. 1.

Referring to FIG. 1, an ESM, generally indicated at 10, comprises an EGR valve body 12, a fluid-pressure-operated actuator 24, an electric-operated vacuum regulator (EVR) valve 26, and a sensor structure 28 that provides an electric signal related to the magnitude of sensed vacuum. The EVR valve 26 and the sensor structure 28 are in fluid communication via connection 30. The construction, operation, and interrelationship of these features are more particularly described in U.S. Pat. No. 6,502,564 B1, the content of which is hereby incorporated by reference into this specification.

Examples of EVR valves that may be used are disclosed in commonly assigned U.S. Pat. No. 5,448,981 to Cook et al. and U.S. Pat. No. 5,967,172 to Cook, which are incorporated herein in their entirety by reference.

The EGR valve body 12 includes an exhaust gas inlet 32, which is adapted to be connected to an exhaust gas supply (not shown), and an exhaust gas outlet 34, which is adapted to be connected to an intake manifold (not shown). A conventional valve 35 in passageway 41 regulates the flow of exhaust gas from the inlet 32 to the outlet 34. A gasket orifice 36 is preferably located at the exhaust gas outlet 34 to develop a pressure differential on either side of the gasket orifice 36 and to provide a seal for the connection to the EGR valve body 12. Specifically, the gasket orifice 36 can be formed as a thin gasket that seals the EGR valve body 12 onto the intake manifold (not shown). The gasket orifice 36 can be made of stainless steel, which provides dimensional stability at high temperatures. Of course, other materials exhibiting similar properties can be used.

Figure 3:
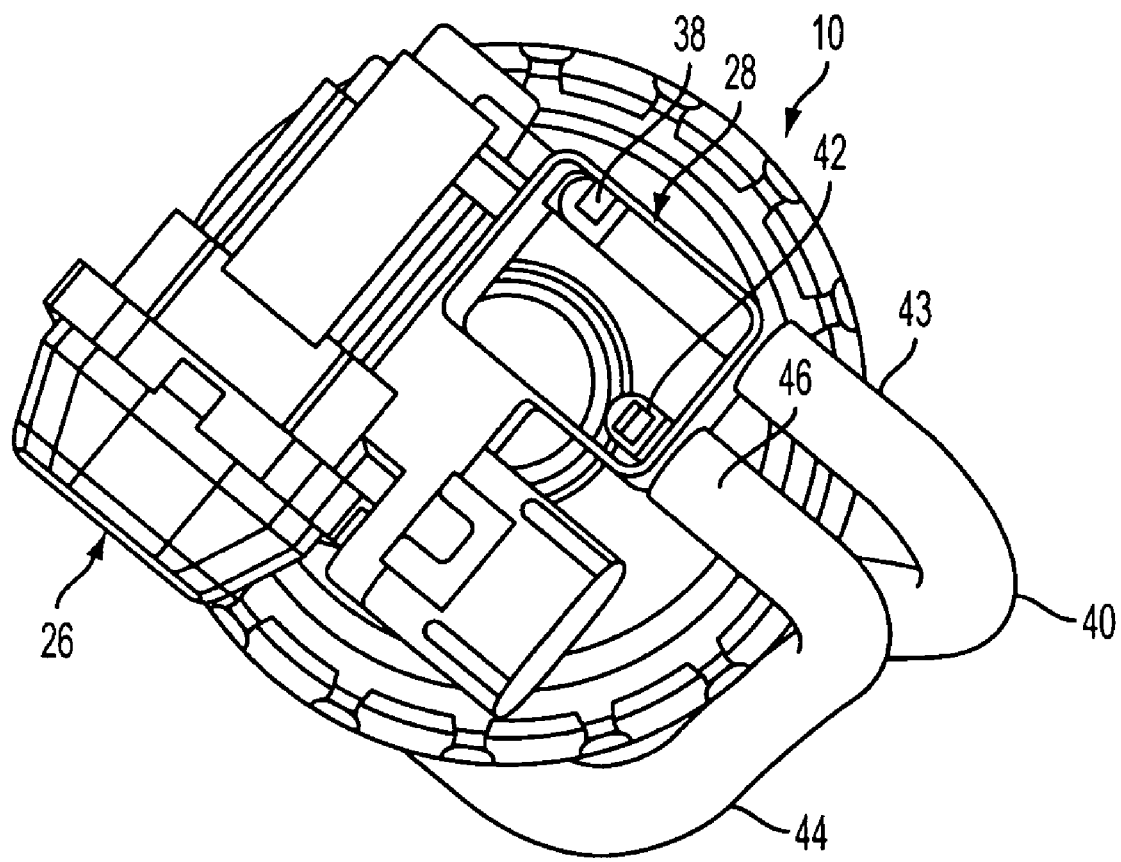
FIG. 3 is a top view of the ESM of FIG. 1, shown with a sensor lid thereof removed for clarity of illustration.

The sensor structure 28 includes a Differential Pressure (DP) sensor 38 that measures the pressures on either side of the gasket orifice 36. An internal passage of end 39 of hose 40 extends within a passage 41 the EGR valve body 12 and provides the DP sensor 38 with the pressure signal from the upstream side, i.e., exhaust manifold side, of the gasket orifice 36. Thus, end 39 is coupled directly with the valve body 12 and the end 43 of hose 40 is associated with the sensor structure 28 (FIG. 3). The hose 40 is considered to be integral with the system module 10. The DP sensor 38 can be connected directly to the intake manifold (not shown) on the downstream side of the gasket orifice 36. The DP sensor 60 continually computes a differential pressure value on either side of the gasket orifice 36 and provides this data to an ECU (not shown), which uses this data to compute an EVR control signal.

In the embodiment, the DP sensor 28 and the EVR valve 26 share hose 40 that provides a source of vacuum. The DP output is not used when the solenoid of the EVR valve 26 is in an un-energized state where the max flow condition occurs, thus, it has no effect on the DP output. As the energy of the solenoid of the EVR valve 26 is increased, flow through this hose 40 is reduced and any offset detected can be compensated through sensor electronics, thus providing a transparent replacement for a conventional product.

With reference to FIG. 3, the sensor structure 28 of the ESM 10 also includes a manifold absolute pressure (MAP) sensor 42 to measure the intake vacuum (pressure at outlet 34). In the embodiment, the MAP sensor 42 requires a dedicated vacuum source from a dead headed hose 44 to provide an accurate pressure reading without corruption. One end 46 of the hose 44 is associated with the sensor structure 28 and thus sensor 42 and the other end 48 of the hose 44 is directly connected with the pick-off port on the EGR valve body 12.

Thus, since the hose 44 is integral to the ESM 10, the need for external vacuum supply lines and vacuum connections is eliminated. Furthermore, the integral hose 44 reduces customer system costs through the elimination of the vacuum harness, assembly plant installation and production test/certification costs. The configuration of the ESM 10 provides a self-contained vacuum EGR system module with only one electrical connection required to operate, which is similar to conventional electric/solenoid driven EGR systems.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A system module for recirculating exhaust gases from an internal combustion engine to an intake manifold of the internal combustion engine, the system module comprising:
    a body including a passageway between an exhaust gas inlet and an exhaust gas outlet,
    an orifice constricting the flow of exhaust gases proximate the exhaust gas outlet,
    differential pressure sensor constructed and arranged to sense differential pressure across the orifice,
    a manifold absolute pressure sensor constructed and arranged to sense vacuum pressure associated with the exhaust gas outlet,
    a first hose coupled with the body and providing the differential pressure sensor with vacuum pressure on a first side of the orifice,
    a second hose coupled with the body and providing the manifold pressure sensor with said vacuum pressure, and
    an electric vacuum regulator (EVR) valve constructed and arranged to regulate vacuum pressure in the body,
    wherein the differential pressure sensor and the manifold absolute pressure sensor are both part of sensor structure that is in fluid communication with the EVR valve.

2. The system module of claim 1, wherein the first hose supplies both the differential pressure sensor and the EVR valve with vacuum pressure.

3. The system module of claim 1, wherein a first end of the first hose is coupled with the body near the orifice and a second end of the first hose is associated with the sensor structure.

4. The system module of claim 1, wherein a first end of the second first hose is coupled with the body near the orifice and a second end of the second hose is associated with the sensor structure.

5. The system module of claim 1, wherein the differential pressure sensor is constructed and arranged to be in fluid communication with a supply of vacuum on a second side of the orifice.

6. The system module of claim 1, wherein the EVR valve is solenoid operated.

7. A system module for recirculating exhaust gases from an internal combustion engine to an intake manifold of the internal combustion engine, the system module comprising:
    a body including a passageway between an exhaust gas inlet and an exhaust gas outlet,
    first means for sensing differential pressure across an orifice associated with the body,
    second means for sensing manifold absolute pressure associated with the exhaust gas outlet,
    means, directly coupled with the body, for providing the first means with vacuum pressure on a first side of the orifice,
    means, directly coupled with the body, for providing the second means with vacuum pressure, and
    an electric vacuum regulator (EVR) valve constructed and arranged to regulate vacuum pressure in the body,
    wherein the first and second means are both part of sensor structure that is in fluid communication with the EVR valve.

8. The system module of claim 7, wherein the means for providing the first means with vacuum pressure is a first hose that supplies both the first means and the EVR valve with vacuum pressure.

9. The system module of claim 7, wherein the first means is a differential pressure sensor and the second means is a manifold absolute pressure sensor.

10. The system module of claim 7, wherein the means for providing the first means is a first hose, a first end of the first hose is coupled with the body near the orifice and a second end of the first hose is associated with the sensor structure.

11. The system module of claim 7, wherein the means for providing the second means is a second hose, a first end of the second first hose is coupled with the body near the orifice and a second end of the second hose is associated with the sensor structure.

12. The system module of claim 7, wherein the first means is constructed and arranged to be in fluid communication with a supply of vacuum on a second side of the orifice.

13. The system module of claim 7, wherein the EVR valve is solenoid operated.

* * * * *